(12) United States Patent
Williams et al.

(10) Patent No.: US 6,328,062 B1
(45) Date of Patent: Dec. 11, 2001

(54) TORSION SPRING CONNECTIONS FOR DOWNHOLE FLAPPER

(75) Inventors: Ronald Williams, Broken Arrow; Michael S. Rawson, Tulsa, both of OK (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/481,590

(22) Filed: Jan. 12, 2000

Related U.S. Application Data

(60) Provisional application No. 60/115,663, filed on Jan. 13, 1999.

(51) Int. Cl.$^7$ ..................................................... F16K 15/03
(52) U.S. Cl. .................. 137/527.2; 137/527; 251/303
(58) Field of Search ............................. 251/303; 137/527, 137/527.2, 527.4, 527.6, 527.8; 166/332.8, 374, 375

(56) References Cited

U.S. PATENT DOCUMENTS

| | | |
|---|---|---|
| 4,019,532 | 4/1977 | Schittek . |
| 4,407,325 | 10/1983 | Cherniak . |
| 4,531,587 | 7/1985 | Fineberg . |
| 5,156,374 | 10/1992 | Fort et al. . |
| 5,411,056 | 5/1995 | Solaroli . |
| 6,003,605 | * 12/1999 | Dickson et al. ................. 251/303 X |

FOREIGN PATENT DOCUMENTS

| | | |
|---|---|---|
| 1308954 | 3/1973 | (DK) . |
| 1563487 | 2/1978 | (GB) . |
| 2198170 | 6/1988 | (GB) . |
| 2236549 | 4/1991 | (GB) . |
| WO86/05853 | 10/1986 | (WO) . |

* cited by examiner

Primary Examiner—Kevin Lee

(57) ABSTRACT

A torsion spring return system for a valve closure member, preferably for downhole use in an SSV, is described. The closure member or flapper uses torsion springs which can be wrapped circumferentially within the body of the downhole tool, generally following the periphery of the flapper. Downward rotation of the flapper stresses the torsion springs so that subsequently, when a flow tube or other device holding the flapper in one position is released, the torsion springs return the flapper to its seat. The connection between the torsion springs and the pin supporting the flapper is either a universal joint or involves an alignment rod running through the torsion spring, as well as other mechanisms which facilitate stress relief in the connection between the torsion spring and pivot pin.

12 Claims, 7 Drawing Sheets

US 6,328,062 B1

TORSION SPRING CONNECTIONS FOR DOWNHOLE FLAPPER

This application claims benefit of provisional application No. 60/115,663 filed Jan. 13, 1999.

FIELD OF THE INVENTION

The field of this invention relates to connection systems for torsion spring closure, particularly useful for flappers and subsurface safety valves.

BACKGROUND OF THE INVENTION

Subsurface safety valves (SSVs) which incorporate a closure member which pivots 90°, also known as a flapper, have been in use for many years. Typically, the flapper is pushed downwardly by a tube to get it out of the way of the flowpath. The tubular that pushes the flapper out of the way is known as the flow tube. The flapper is typically spring loaded, such that when the flow tube is pushed or otherwise urged upwardly away from the flapper, the torsion spring or springs bias the flapper 90° to close the flowpath as the flapper engaged a mating seat.

Prior art designs for return springs on flappers are illustrated in FIGS. 1 and 2. FIG. 1 illustrates a flapper 10 which has dual hinges 12 and 14, which are secured by a pin 16 to the body 18 of the SSV. A torsion spring 20 has an annular shape and the pin 16 extends through it as well as through the hinges 12 and 14. A tab 22 comprises the end of the torsion spring 20 and bear on the flapper 10. At the opposite end of the spring 20, another tab 24 is braced against the body 18. When the flow tube (not shown) is pushed down, the torsion spring 20 winds up as the flapper 10 is pushed down through an arc of 90° to get it out of the way so that flow of fluids can occur through the flow tube. When the flow tube is allowed to move upwardly, the spring 20, acting through tab 22, initiates the reverse movement through an arc of 90° of the flapper 10 so that the flapper 10 closes against its mating seat (not shown). One of the problems with this design is limitation of space, which in turn forces the use of fairly high stresses in the springs, such as 20, when used in SSVs. The design of FIG. 1 also has limitations on the closure force available due to the space requirements for fitting the spring between two hinges 12 and 14. Indeed, some designs do not accommodate the use of dual hinges 12 and 14 and, in those instances, the torsion springs have been disposed circumferentially around the periphery of the flapper, as is more clearly illustrated in FIG. 2.

FIG. 2 is another prior art design that involves a flapper 26 which has a single hinge 28. A pin 30 extends through hinge 28 to support the flapper 26 for 90° rotation. Pin 30 has passages or openings 32 and 34 on opposite ends thereof. A pair of torsion springs 36 and 38 are disposed circumferentially adjacent the periphery of the flapper 26. On one end, the torsion springs 36 and 38 are respectively connected to the body 40 of the SSV at connections 42 and 44. At the other end of torsion springs 36 and 38, there are hooks 46 and 48. Hooks 46 and 48 extend respectively through openings 32 and 34. Accordingly, when the flapper 26 is pushed downwardly by the flow tube (not shown), the springs 36 and 38, because of their connections through openings 32 and 34 to the pin 30, resist such movement and coil up to store a closing force. Pin 30 rotates with flapper 26, thus rotating the hooks 46 and 48 as the flapper 26 reaches the fully open position of the SSV. One of the potential problems with this design is the multi-axial movement of the hook ends 46 and 48 in openings 32 and 34. This results in excessive friction and wear of the hook ends 46 and 48, with the possibility of a fatigue failure adjacent the point where the hook ends 46 and 48 enter or exit the openings or passages 32 and 34. This multi axial movement coupled with the multiple interfaces between the flapper and torsion springs can result in excessive play between the torsion spring hook ends, pin and flapper. During the rotation of the flapper and pin, the multi-axial movement of the hook ends can create excessive friction. This friction, combined with the excessive play in the system, can negate some of the force that is stored in the torsion springs.

Accordingly, the objective of the present invention is to facilitate the use of the wrap around style of torsion springs, such as 36 and 38, while at the same time providing an improved torsional loading point which supports the flapper so that excessive play and friction is eliminated.

Accordingly, the objective of the present invention is to facilitate the use of a wraparound style of torsion springs, such as 36 and 38, while at the same time providing an improved connection to the pin which supports the flapper so that concentrated zones of high stress are eliminated and the likelihood of fatigue failure is also severely reduced, if not completely eliminated.

Accordingly, alternative proposals are described to accomplish the objective as will be apparent to those skilled in the art from a review of the description of the preferred embodiments of the invention.

SUMMARY OF THE INVENTION

A torsion spring return system for a valve closure member, preferably for downhole use in an SSV, is described. The closure member or flapper uses torsion springs which can be wrapped circumferentially within the body of the downhole tool, generally following the periphery of the flapper. Downward rotation of the flapper stresses the torsion springs so that subsequently, when a flow tube or other device holding the flapper in one position is released, the torsion springs return the flapper to its seat. The connection between the torsion springs and the pin supporting the flapper is either a universal joint or involves an alignment rod running through the torsion spring, as well as other mechanisms which facilitate stress relief in the connection between the torsion spring and pivot pin.

DETAILED DESCRIPTION OF THE PREFERRED EMBODIMENT

Figure 3:
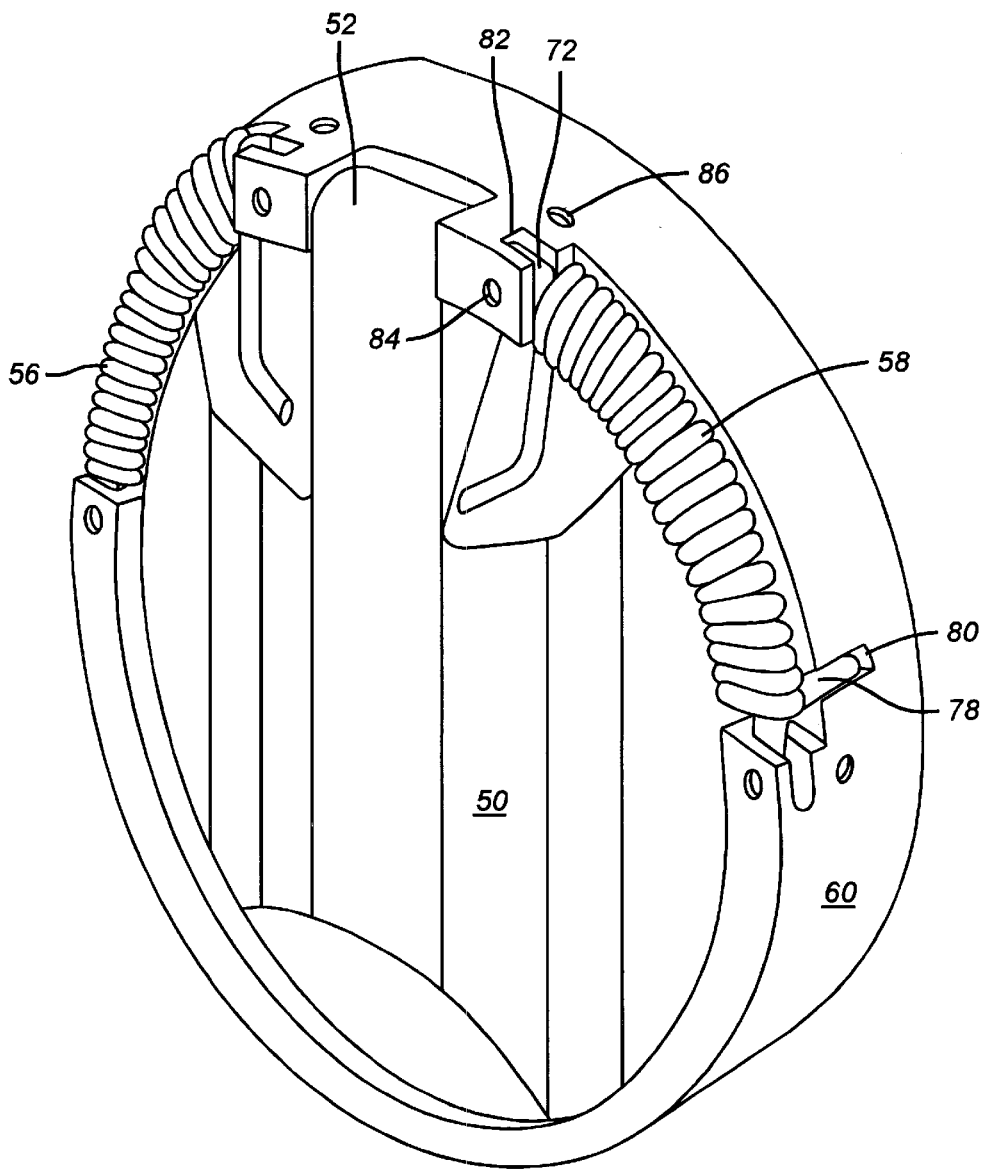
FIG. 3 is a perspective view of the embodiment of the invention, illustrating the use of an internal rod to guide the torsion spring circumferentially about the periphery of the flapper.
Figure 4:
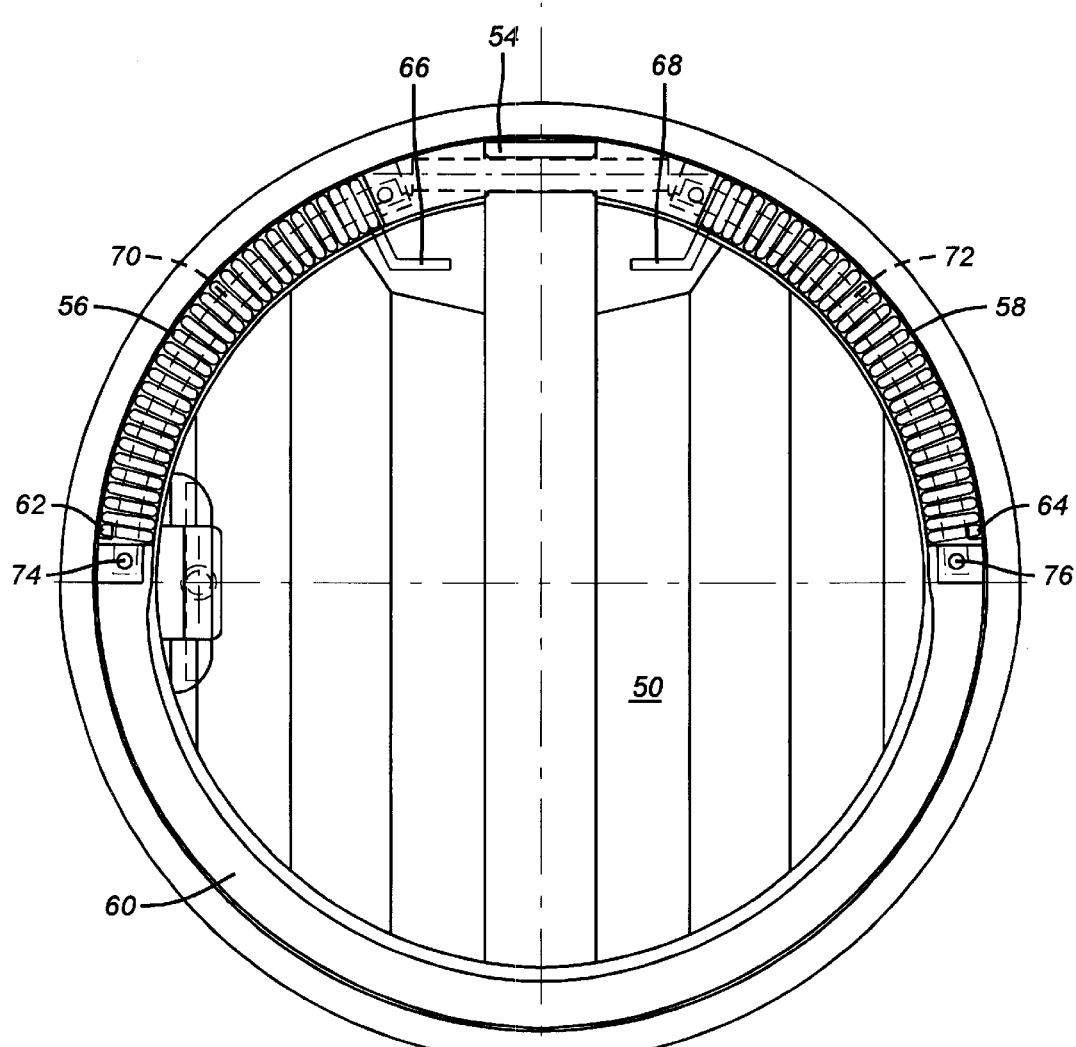
FIG. 4 is a bottom view of the flapper shown in FIG. 3, illustrating the placement of the flapper pin.

Referring to FIGS. 3 and 4, the flapper 50 has a hinge 52 through which extends a flapper pin 54 (see FIG. 4). Referring to FIG. 4, torsion springs 56 and 58 are disposed circumferentially about the flapper base 60. Ends 62 and 64 of torsion springs 56 and 58 are secured to the flapper base 60. Tabs 66 and 68 extend respectively from torsion springs 56 and 58 into contact with the flapper 50. Those skilled in the art will appreciate that downward rotation of the flapper 50 pushes the tabs 66 and 68 downwardly to store a torsional force in torsion springs 56 and 58. Guiding the torsion springs 56 and 58 are alignment rods 70 and 72, respectively. Alignment rods 70 and 72 extend through the coils which comprise the torsion springs 56 and 58. Pins 74 and 76 respectively connect alignment rods 70 and 72 at one end to the flapper base 60. FIG. 3 shows the manner in which the torsion spring 58 is secured to the flapper base 60 by virtue of a tab 78 extending into a groove 80. A similar technique is used to attach the end of torsion spring 56 to the flapper base 60.

The alignment rods 70 and 72 are connected at the hinge end to the flapper base 60 as shown in FIGS. 3 and 4. For illustration, rod 72 extends into a groove 82 in the flapper base 60 and its position is fixed by a pin 84, while the pin itself is secured with another pin (not shown) inserted through opening 86. Thus, the alignment rods 70 and 72 do not rotate when the flapper turns. Instead, rotation of the flapper 50 displaces the tabs 66 and 68 so as to torque up the torsion springs 56 and 58 around their internal guides which are the alignment rods 70 and 72.

Figure 1:
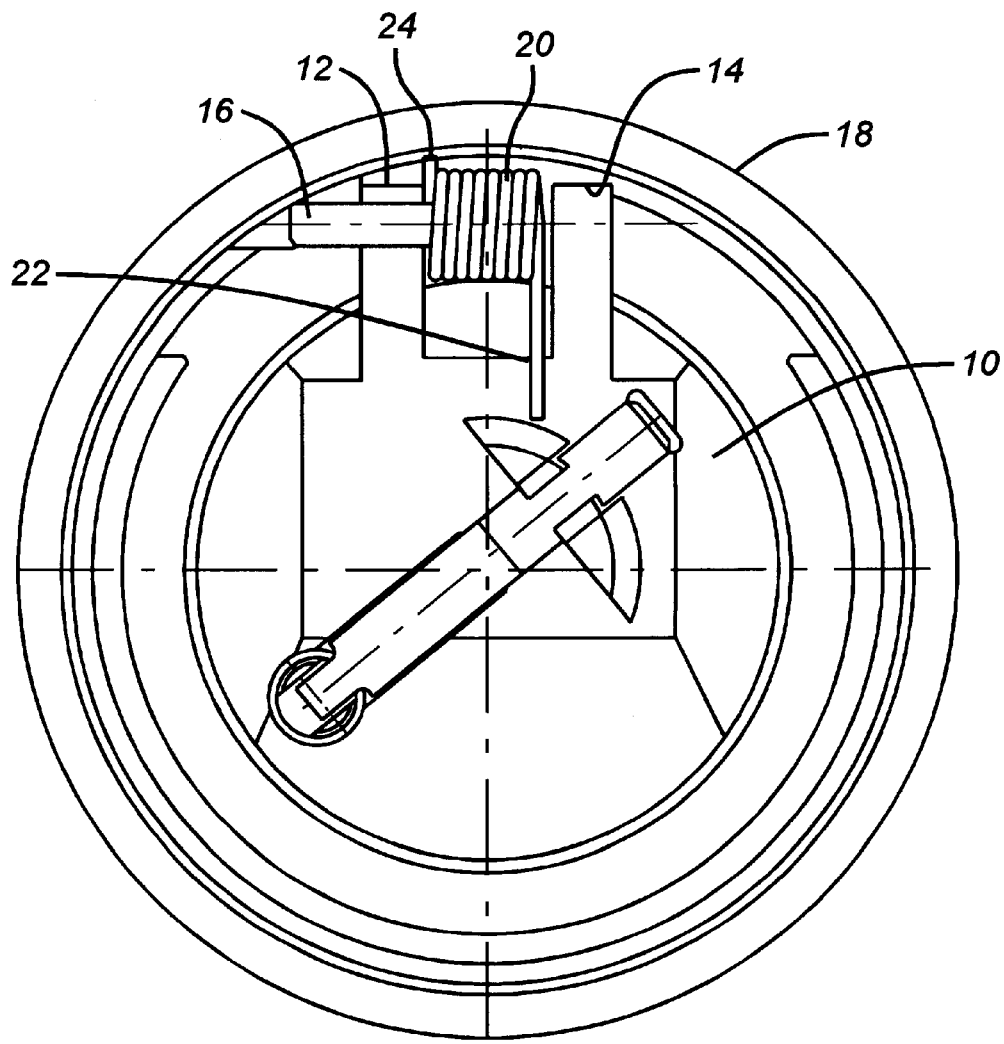
FIG. 1 is a representation and section view of the under side of a prior art two-hinge flapper with a torsion spring between the hinges.
Figure 2:
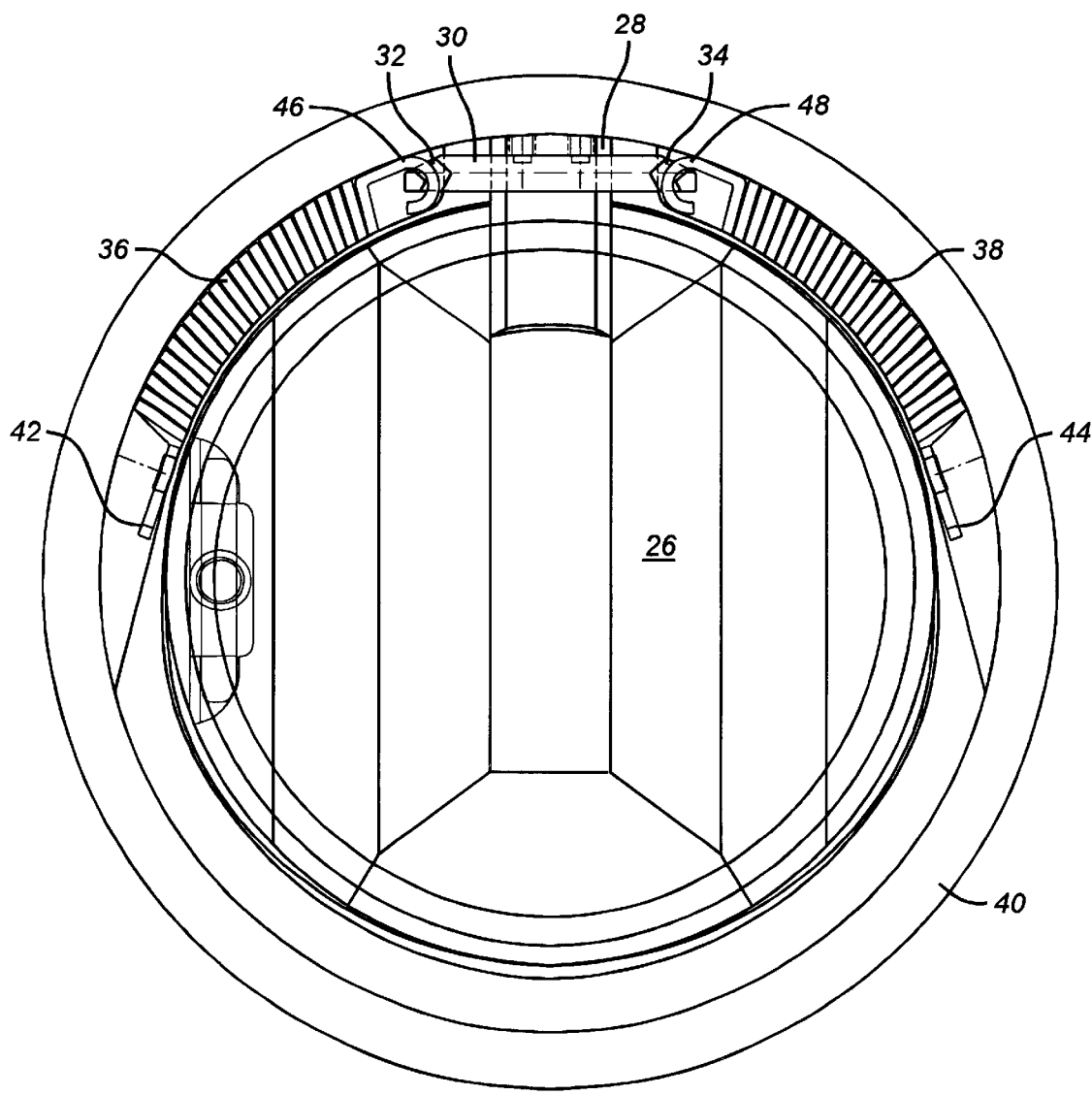
FIG. 2 is a bottom view of a prior art single-hinge flapper with two circumferential torsion springs illustrating the prior art hook design into the pivot pin.

Those skilled in the art can readily see the improvement of the design in FIGS. 3 and 4 over the prior art illustrated in FIG. 2. The points in which excessive play and friction could occur in the in the FIG. 2 design have been eliminated. The torsion springs 56 and 58 are guided through the centrally extending alignment rods 70 and 72 for full support along their length. Rotation of the flapper 50 is directly translated into tabs 66 and 68. This eliminates movement in a variety of planes, which was characteristic of the operation of the design of FIG. 2. Simply put, with the operation using the alignment rods 70 and 72, a force is transmitted directly from the flapper 50 to the tabs 66 and 68, with the tabs 66 and 68 acting as levers to apply a torsional force to the torsion springs 56 and 58. In response to torsion, springs 56 and 58 wind more tightly around the guides which are the alignment rods 70 and 72. Thus, even in the face of frequent cycling of the flapper 50, the torsion springs work as normally intended and handily fit in tight, confined spaces which are required in SSV designs. The shear loading, which occurred when the hook such as 48 extended through an opening such as 34, is eliminated. Excessive play and friction, which occurred when the hook such as 48 extended through an opening such as 34, is eliminated. Instead, the load is distributed from the flapper 50 onto the tabs 66 and 68, ensuring that the torsion spring forces acting on the flapper are maximized.

Figure 5:
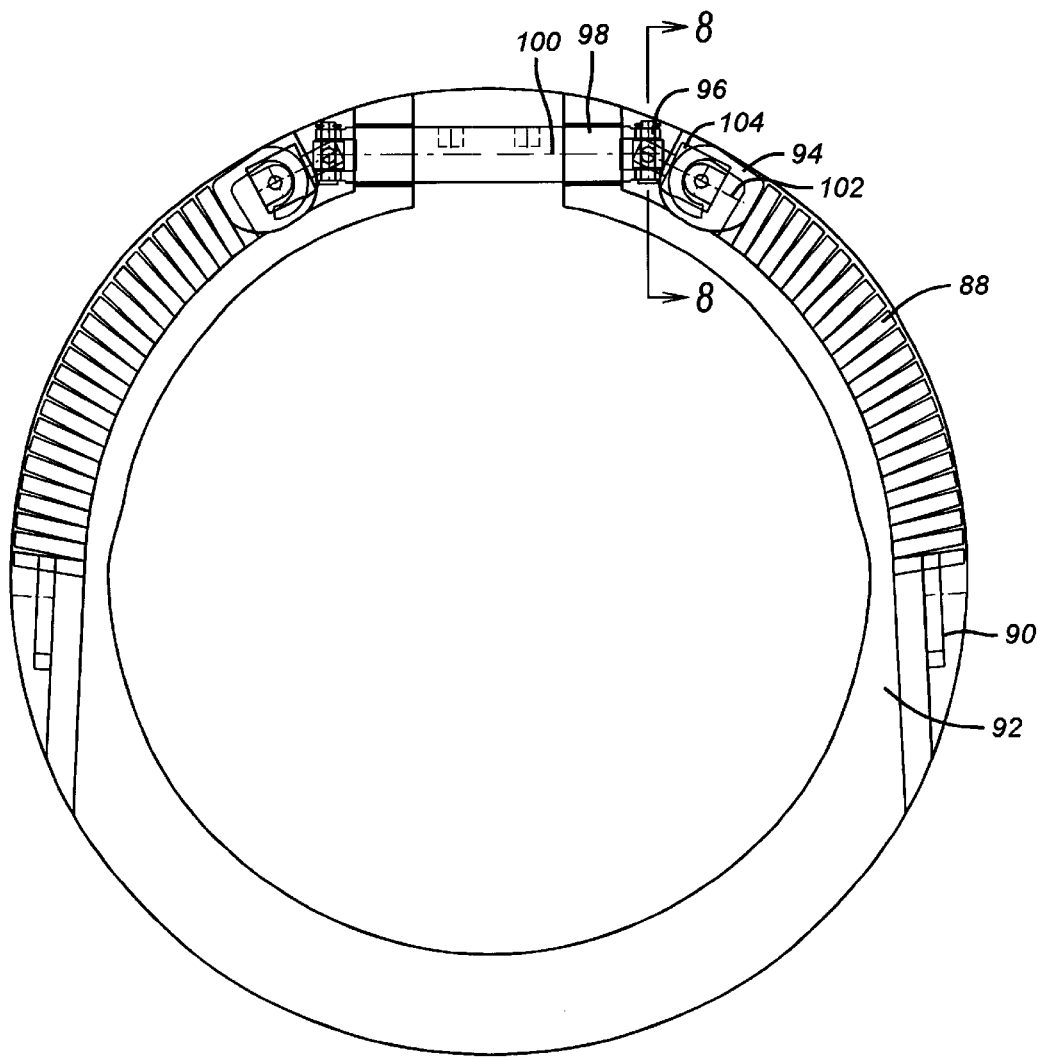
FIG. 5 is a bottom view of an alternative embodiment employing a universal joint between the flapper pin and torsion spring.
Figure 6:
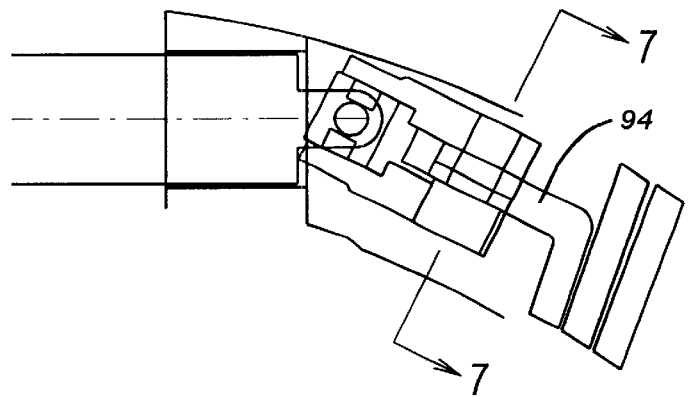
FIG. 6 is a view of FIG. 5 rotated 90°.
Figure 7:
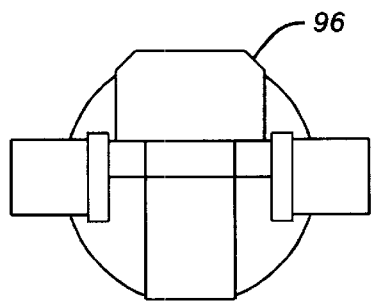
FIG. 7 is the view along lines 7—7 of FIG. 6.
Figure 8:
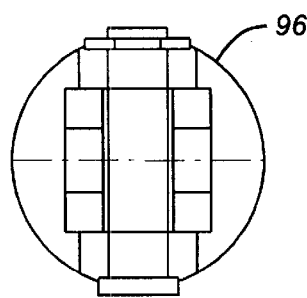
FIG. 8 is the view along lines 8—8 of FIG. 5.

The concept is further illustrated by an alternative embodiment shown in FIGS. 5–8. Referring to FIG. 5, one of the torsion springs 88 is illustrated. It has an end 90 connected to the flapper base 92. The opposite end 94 is secured to a universal joint 96. The opposite end of the universal joint 96 is connected to the flapper pin 98. In the known manner of universal joints, an offset is accommodated from the central axis of the flapper pin 98 and the end 94 of the torsion spring 88. Thus, rotation of the flapper (not shown) results in rotation of the pin 98 with the offset between axis 100 of pin 98 and axis 102 of the torsion spring 88 being compensated for or by the universal joint 96. The universal joint successfully accommodates the offset in axes 100 and 102 to eliminate excessive play and friction problems previously described with respect to the prior art design of FIG. 2.

Figure 9:
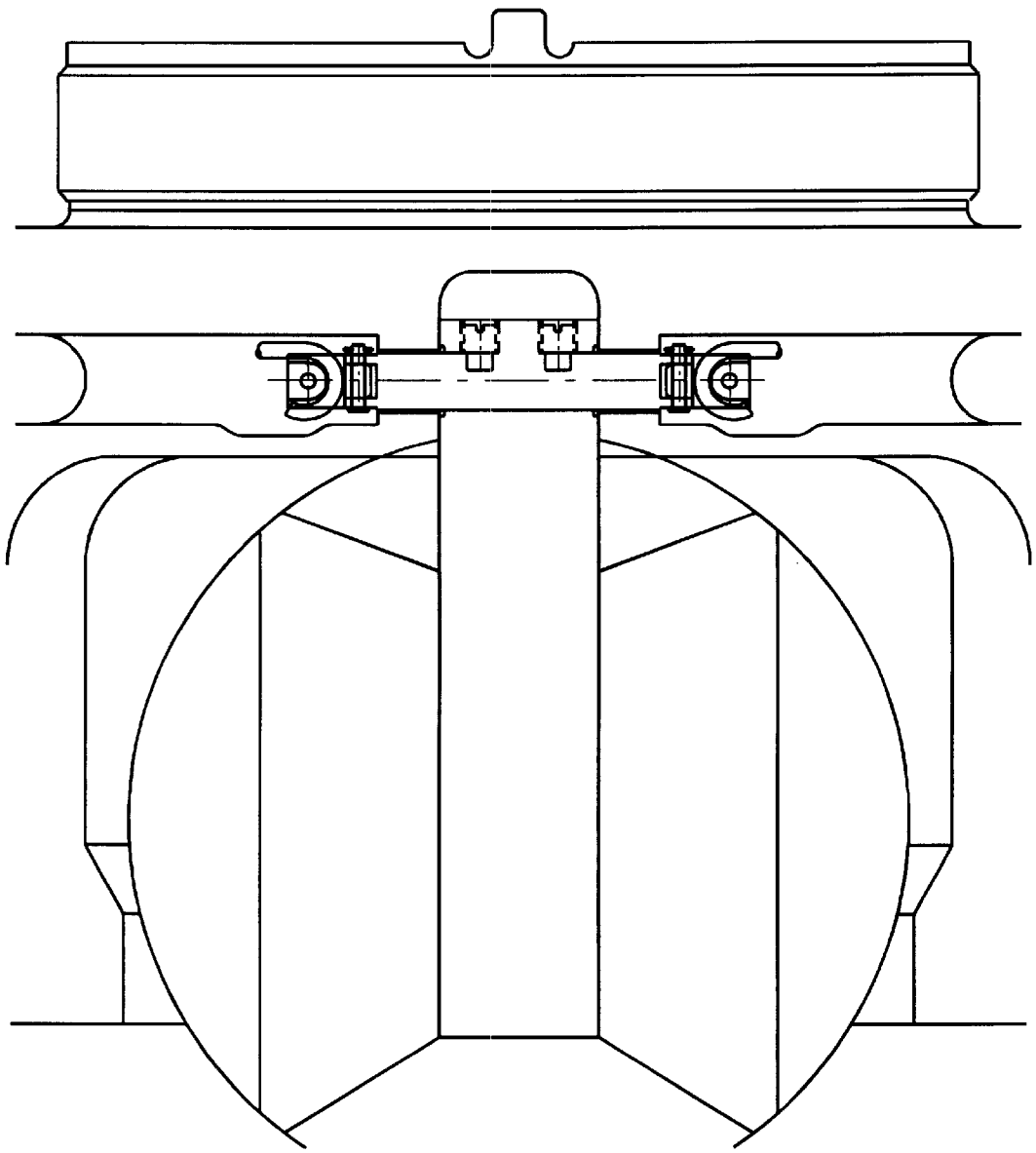
FIG. 9 is an alternative embodiment using a portion of a universal joint.

As an alternative to the universal joint 96, the end 94 can be affixed to the pin 98 through a rigidly connected hub such as 104, which is illustrated as a portion of the universal joint in FIG. 5. Thus, in this embodiment shown in FIG. 9, the complete universal joint is eliminated in favor of what amounts to one-half of a universal joint, with hub 104 fixedly mounted to the pin 98. While this solution is not as desirable as the universal joint, it still is an improvement over the prior art designs of FIG. 2, as it is less prone to friction and excessive play than the hook design extending through a passage in the pin.

The foregoing disclosure and description of the invention are illustrative and explanatory thereof, and various changes in the size, shape and materials, as well as in the details of the illustrated construction, may be made without departing from the spirit of the invention.

What is claimed is:

1. In combination, a closure system and a flapper connected to a base by a pin extending through dual hinges in a downhole valve, and further comprising an edge, said closure system comprising:

at least one torsion spring mounted to said base outside said dual hinges and in the plane of said pin, said spring having a curvature to allow said torsion spring to follow the edge of the flapper; and a first tab projecting from said spring, said first tab, when rotated by the flapper producing a stored force in said torsion spring for use in subsequent rotation of the flapper, by said first tab.

2. The system of claim 1, further comprising:

at last one guide for said torsion spring.

3. The system of claim 2, wherein:

said guide extends through said spring.

4. The system of claim 3, wherein:

said guide is secured adjacent opposed ends thereof.

5. The system of claim 4, wherein:

said spring comprises a coil with said first tab forming a first end thereof.

6. The system of claim 5, wherein:

said spring comprises a second tab located at a second end thereof opposite said first tab.

7. The system of claim 6, wherein:

said second tab engages the base to brace said spring for rotation of said first tab.

8. In combination, a closure system and a flapper connected to a base by a pin extending through dual hinges in a downhole valve, comprising:

at least one torsion spring mounted to said base and operably connected at one end thereof to said pin; and a flexible joint interposed between said spring and said pin to facilitate rotation of said spring when said flapper is rotated.

9. The system of claim 8, wherein:

said flexible joint further comprises at least half a universal joint.

10. The system of claim 9, wherein:

said flexible joint comprises a complete universal joint.

11. The system of claim 10, wherein:

said torsion spring comprises a coil.

12. The system of claim 11, further comprising:

a pair of torsion springs, each having an end connected to a flexible joint which is in turn connected to the pin.

* * * * *